United States Patent
Faulstich

(10) Patent No.: US 7,937,182 B2
(45) Date of Patent: May 3, 2011

(54) DIAGONAL GENERATING METHOD TO GENERATE TOOTH FLANKS WITH SPECIFIED TWIST AT SPECIFIED FLANK LINE CROWNING

(75) Inventor: Ingo Faulstich, Ludwigsburg (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 261 days.

(21) Appl. No.: 12/154,312

(22) Filed: May 22, 2008

(65) Prior Publication Data

US 2008/0292420 A1 Nov. 27, 2008

(30) Foreign Application Priority Data

May 22, 2007 (EP) ..................... 07010133

(51) Int. Cl.
*G06F 19/00* (2006.01)
*B23F 19/00* (2006.01)

(52) U.S. Cl. ........ 700/192; 700/160; 700/176; 700/193; 409/8; 409/32

(58) Field of Classification Search ............ 700/159, 700/160, 164, 172–178, 182, 186, 192, 193; 409/8, 32; 451/1, 5, 47

See application file for complete search history.

(56) References Cited

U.S. PATENT DOCUMENTS

| | | | |
|---|---|---|---|
| 4,850,155 A | 7/1989 | Sulzer | |
| 4,954,027 A | 9/1990 | Faulstich | |
| 5,765,974 A | 6/1998 | Faulstich | |
| 6,217,409 B1 | 4/2001 | Stadtfeld et al. | |
| 6,422,924 B1 | 7/2002 | Faulstich et al. | |

FOREIGN PATENT DOCUMENTS

| | | |
|---|---|---|
| DE | 3704607 | 8/1988 |
| DE | 3816270 | 11/1989 |
| DE | 4012432 | 7/1991 |
| EP | 1036624 | 9/2000 |
| GB | 2246971 | 2/1992 |

OTHER PUBLICATIONS

Schriefer, Herbert, "Continuous CNC Gear Grinding", The Gleason Works, Rochester, New York, Mar. 1996.
European Patent Office Search Report and Written Opinion (with English translation) for EP 07010133.2, Oct. 30, 2007.

*Primary Examiner* — Sean P Shechtman
(74) *Attorney, Agent, or Firm* — Robert L. McDowell

(57) ABSTRACT

By coordinating the amount and course of the crowning of the tool and the diagonal ratio, a twist is created with a simple tool, and superimposed on the natural twist, thus resulting in the twist required for the work piece. Furthermore, an additional portion of the crowning is superimposed on the portion of the crowning of the work piece which is the result of the crowning of the tool during the machining in the diagonal method, thus resulting in the required crowning of the work piece, with the additional portion of the crowning being generated by changing the spacing between tool and work piece during the machining.

5 Claims, 6 Drawing Sheets

DIAGONAL GENERATING METHOD TO GENERATE TOOTH FLANKS WITH SPECIFIED TWIST AT SPECIFIED FLANK LINE CROWNING

This application claims the benefit of European Patent Application No. 07010133.2 filed May 22, 2007 the entire disclosure of which is hereby incorporated by reference.

FIELD OF THE INVENTION

The invention relates to a method for machining the flanks of essentially cylindrical but flank line crowned gears in the continuous diagonal generating method.

BACKGROUND OF THE INVENTION

The generation of helically toothed flank line crowned cylindrical gears in the continuous generating method results in torsioned flanks. One measure of the torsion is the twist. The object to be attained is to avoid the twist or generate a twist that deviates from the "natural twist."

To attain an object of the invention, i.e. to avoid the twist, it is known from DE 37 04 607 to machine the gears in the continuous diagonal generating method and in doing so, use a volute tool having a pressure angle of the right- and left flanks that decreases continuously proceeding from a maximum value at one end of the worm towards the other end, with the maximum pressure angle of the right flanks at one end of the worm coinciding with the minimum pressure angle of the left flanks, and vice versa. This tool is very difficult to produce and not very flexible to use.

EP 1 036 624 A2 proposes to use a worm with a modified lead as tool. With this tool, the lead of the flanks changes proceeding from one end of the worm toward the other end of the worm in proportion to the distance from the end of the worm, with the maximum lead of the one flank at one end of the worm coinciding with the minimum lead of the other flank at that worm end, and vice versa. This type of tool is flank line crowned or flank line hollow crowned. The tool is supposed to work in the diagonal method. If the axial distance between tool and work piece is kept constant during the machining of a work piece in the dual-flank machining, a flank line crowning on both flanks of the work piece—convex from the outside (positive) or concave from the outside (negative)—as well as a twist are created.

If only the sign of the diagonal ratio D, i.e. the direction into which the tool is displaced during the shift of the axial carriage in the direction of its axis of rotation, is changed for the machining of an additional work piece, flank line crowning and twist are also created on both work piece flanks. However, relative to the work piece machined previously, the twist has a different amount and the opposite sign.

EP 1 036 624 A2 proposes to generate one part of flank line crowning and twist by changing the center distance during the shift of the axial carriage, and a second part with the tool working in the diagonal method, and to coordinate the crowning of the tool as well as the adjustment data of the machine in such a way that the desired values for flank line crowning and twist are created at the work piece.

EP 1036624 A2 also discloses how the associated twist can be calculated from a flank line crowning generated by changing the center distance during the shifting of the axial carriage. The discussion proceeds on the assumption that the twist generated from a flank line crowning generated by a lead modified tool used in the diagonal method can be calculated in accordance with the invention in the same way as the twist resulting from a flank line crowning that was generated by a change of the spacing between the axes (of tool and work piece) during the machining.

Although the use of a lead modified tool in the diagonal method results in a portion of the twist as stated in the above European patent application, said portion—with the amount of flank line crowning being the same—is not different from a portion of the twist that results from a change of the spacing between the axes during the shifting of the axial carriage. A change of the sign of D does not change this portion of the twist.

However, the use of a lead modified tool also creates an additional, previously unknown portion of the offset. Only this portion can be used to influence the twist of the gearing, if the amount of the flank line crowning is specified. Thus, the method proposed in the European patent application cannot avoid the twist if there is flank line crowning, or even create a twist that specifically varies from the "natural twist."

The invention is therefore based on the problem of developing the generic method in such a way that flank line crowned modified flanks can be generated in the single flank and/or dual flank process with practically any offset, that geometrically simple tools can be used, and that the tool length required for the machining can largely be randomly selected.

SUMMARY OF THE INVENTION

By coordinating the amount and course of the crowning of the tool (e.g. hob, grinding worm) and the diagonal ratio, a twist is created with a simple tool, and superimposed on the natural twist, thus resulting in the twist required for the work piece. Furthermore, an additional portion of the crowning is superimposed on the portion of the crowning of the work piece which is the result of the crowning of the tool during the machining in the diagonal method, thus resulting in the required crowning of the work piece, with said additional portion of the crowning being generated by changing the spacing between tool and work piece during the machining. It is possible to realize the desired values for flank line crowning and twist of the work piece with tools of having a length that can be largely randomly selected. The crowning of said tools must then be adapted to said length. With the proposed measures, the object of the invention is attained in a simple manner and with simple tools.

The machining process may also be simulated on a computer. In each area of the work piece width, the center distance and diagonal ratio, or center distance and modification of the tool, are varied during the shifting of the axial carriage. In doing so, the influences on the generation contact tracks which result from the change in the center distance and diagonal ratio or center distance and tool modification during the shifting of the axial carriage are determined, superimposed, and iteratively modified in such a way as to create the desired course of the flank lines and an optimally adjusting the torsion of the flanks to the specification.

DETAILED DESCRIPTION OF THE PREFERRED EMBODIMENTS

In the following, it will be explained how the twist of the flanks is created in the machining of helical-toothed flank line crowned cylinder gears in the continuous generating method, how it can be avoided or adjusted to a desired value, and how the tools required (e.g. hobbing, grinding) are designed.

Figure 1:
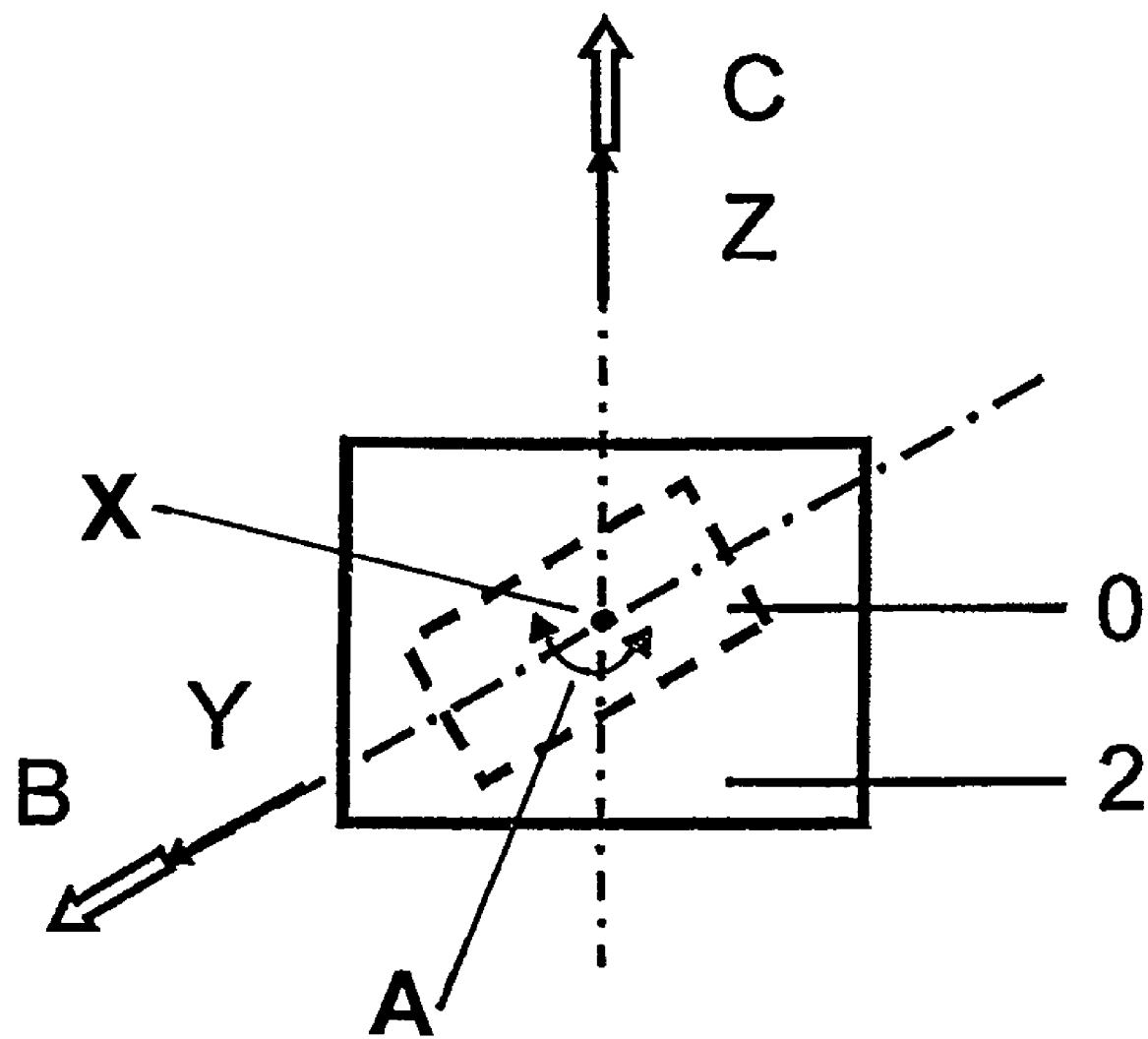
FIG. 1 illustrates a tool 0, a work piece 2, as well as axes A, B, C, X, Y and Z of a machine tool to describe positions, paths and movements of the tool and work piece.
Figure 2:
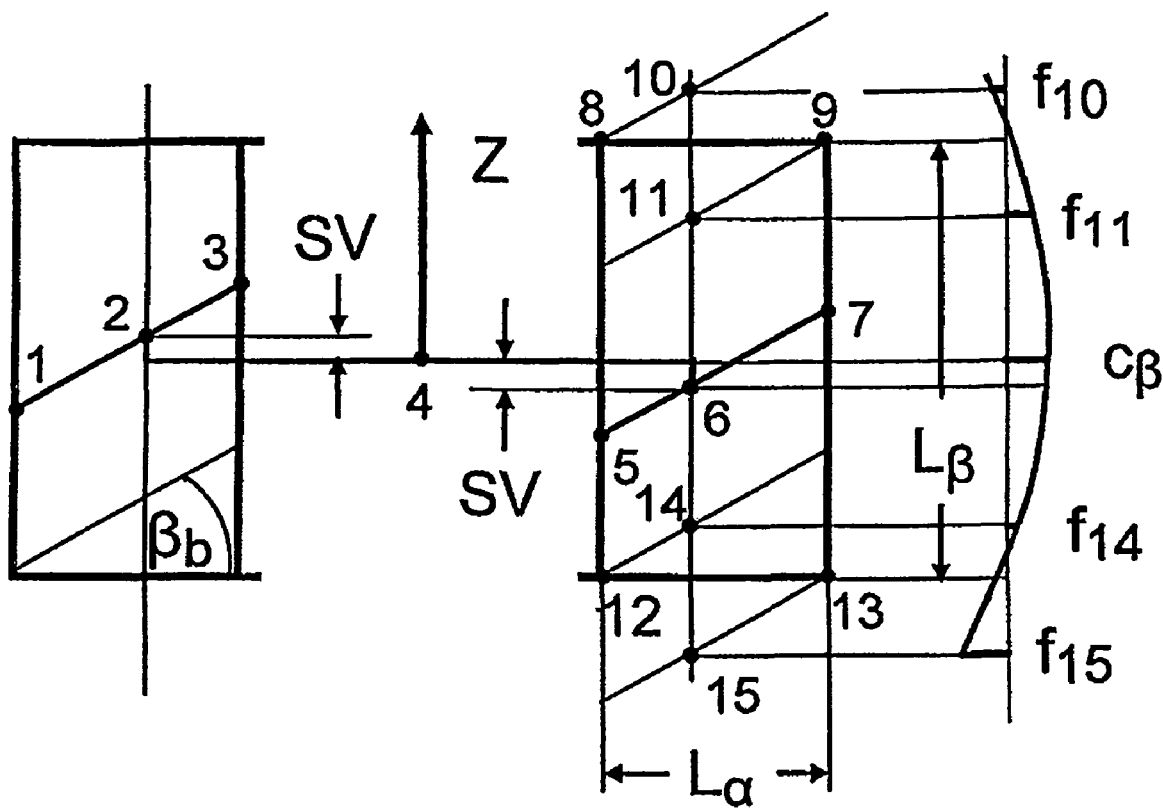
FIG. 2 is a representation to determine the flank topography of the left flanks and right flanks of a right hand helical gear with flank line crowning, generated in the diagonal generating method with a cylindrical tool.

The discussion proceeds from a machine with a vertical axis of rotation of the work piece 2, as is known from hobbing. The axes to describe positions, paths and movements (FIG. 1) are:

X Center distance (radial)
Y Tool axial direction (tangential)
Z Work piece axial direction (axial)
A Tilt tool axis
B Rotation tool
C Rotation work piece Unless there are modifications, the flanks of the cylindrical gears discussed here are formed by involute helical surfaces, which are poorly suited to explain quantitative contexts. Therefore, in the following, the flanks are shown in a tangential plane at the base cylinder (FIG. 2). By this transformation the geometrically complicated involute helical surfaces result in rectangles with the edge lengths $L_\alpha$ and $L_\beta$. These rectangles are called "measuring fields" in the following.

If a wheel is rotated around its axis, the piercing points of helical lines describe vertically running straight lines in the measuring field. Transverse sections of the gear wheel describe horizontally running straight lines. The contact points between a volute tool and a flawlessly machined flank are also on a straight line, i.e. the generation contact track. The generation contact track is inclined relative to the transverse plane under the angle $\beta_b$ as long as the axial feed is small. This condition is present in the applications discussed here. If necessary, the influence of the feed on the inclination angle can be calculated via known contexts and the correct angles can be used for the further discussion.

The straight lines 1, 2, 3 and 5, 6, 7 which run oblique across the flank in FIG. 2, are generation contact tracks. If a rigid connection is maintained between the generation contact tracks of the left flanks L and the right flanks R via the line running through point 4 and point 4 is moved into direction Z, the straight lines describe the geometry of the flanks being created. If the point and thus the generation contact tracks are raised corresponding to the course of the crowning curve stated in the right part of the representation while the point 4 moves into the direction Z, each of the generation contact tracks describes an enveloping surface over the measuring field of the left flank and/or right flank. These surfaces envelope the flanks that were generated and they represent the topography of the flank line crowned flanks that were generated with cylindrical tools.

If one of these enveloping surfaces, such as the enveloping surface of the right flank, for example, is intersected with a transverse plane, the intersecting line represents the course of the profile deviation of this flank in the respective transverse plane. If the enveloping surface is intersected with a circular cylinder concentric to the wheel location axis or, relative to FIG. 2, with a plane perpendicular to the measuring field and perpendicular to the transverse plane, the intersecting line represents the course of the flank line deviation on the respective cylinder. The profile and/or flank line deviations of interest can be dependably determined with the help of a computer according to the method described here, and the respective slope deviations can be calculated from the course of the deviations. The profile or flank line deviations, respectively measured in two planes of a flank or on two cylinders respectively, are required to determine the twist of a flank. The twist $S_\alpha$ can then be determined through profile slope deviations as follows:

$$S_\alpha = f_{HaI} - f_{HaII}$$

where $f_{HaI}$ and/or $f_{HaII}$ the profile slope deviations in the planes I and/or II.

For further discussion, it is useful to determine the twist analytically. This makes it easier to understand the geometrical contexts and determine the process as well as the required tools. In most cases, the demanded course of the flank line crowning can be described with a quadratic parabola. In these cases, the twist of a flank can be calculated from the height of the enveloping surface over and/or under the four corner points of the measuring field respectively. The four corner points of the measuring field of the right flank in FIG. 2 are 8, 9, 13 and 12. All points of a generation contact track in FIG. 2 have the same height over or under the measuring field in good approximation. If this height is designated f, the following applies:

$$f_{HaI} = f_{11} - f_{10} \text{ and}$$

$$f_{HaII} = f_{15} - f_{14}.$$

If the individual heights are calculated with the quadratic parabola that describes the course of the flank line crowning of the work piece, a simple equation can be provided for the twist of the flank. When taking into account that the crowning in the present case was generated according to the prior art, the twist calculated here can be called natural twist $S_{nat}$. The following applies:

$$S_{nat} = k_1 * C_\beta$$

where $k_1$ is a constant that results from the calculation explained above.

Because of the track offset SV, the high points of the crowning on left flanks and/or right flanks are offset by 2*SV in axial direction of the work piece 2. This leads to a flank line slope deviation on both flanks. These deviations can be calculated and removed and/or avoided with appropriate correction settings on the machine.

Figure 3:
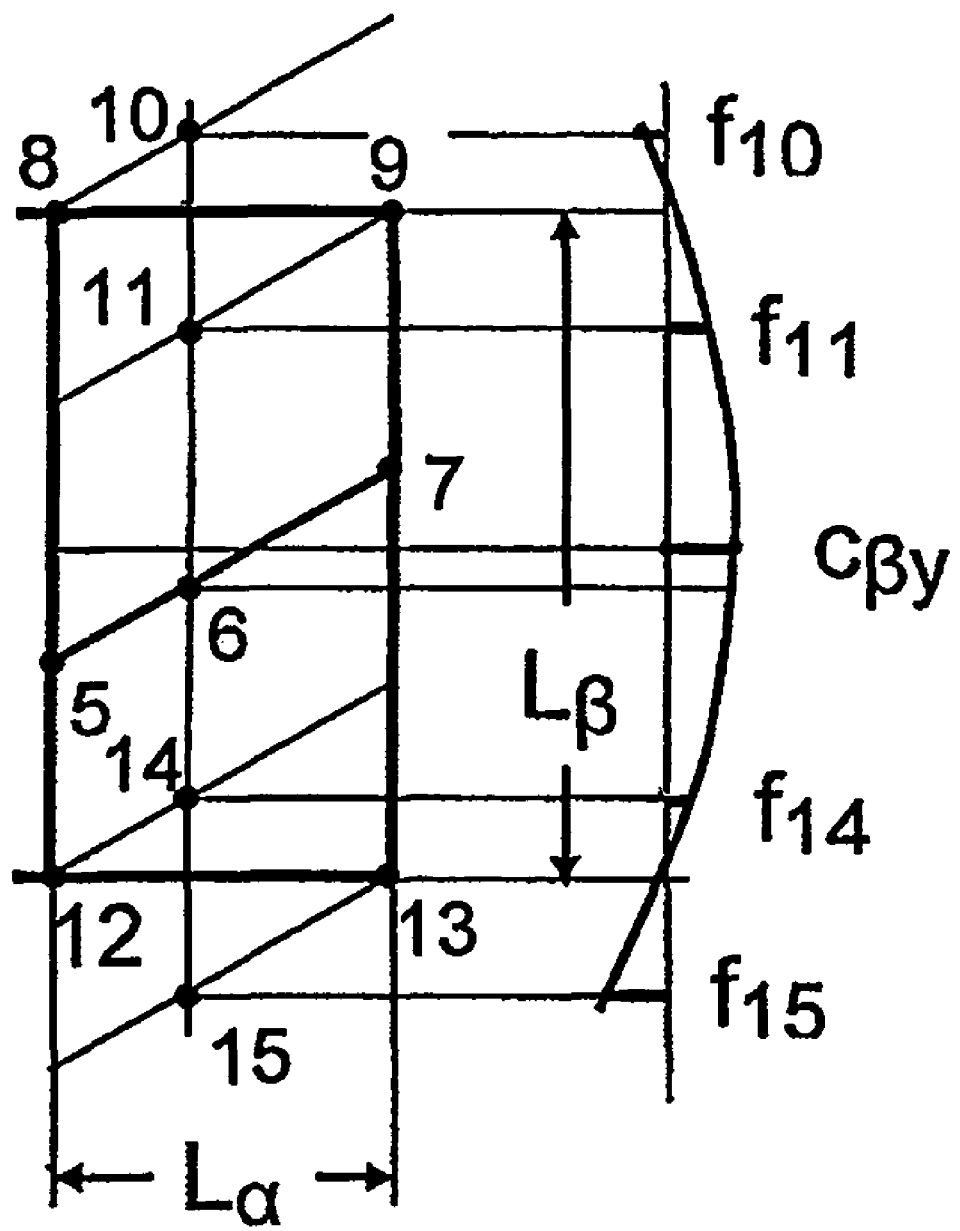
FIG. 3 is a representation to determine the flank topography of a right flank of a right hand helical gear with flank line crowning, generated in the diagonal generating method with hollow-crowned modified tool.

If a volute tool modified in a crowned fashion in the direction of its axis of rotation is used to generate a work piece crowning, working in the diagonal process also results in a twist. The calculation of said twist is not as simple as the calculation of the natural twist. The following observations relate to the use of a hollow-crowned tool in the machining of the right flank of a right hand helical gearing in the diagonal process. The distance between the tool and the work piece is constant. The transformation of the generation contact tracks on the plane of projection again results in straight lines, which are inclined toward the transverse planes under $\beta_b$. However, the generation contact tracks do not run in straight lines perpendicular to the measuring field. Rather, they can be described as part of the crowning introduced into the tool and thus as part of a parabolic curve. In FIG. 3, the crowning of the tool has been folded into the plane of projection.

Because the machining is performed in the diagonal process, all generation contact tracks in various Z positions perpendicular to the measuring field have a different shape. This shape can be calculated. Thus, it is possible to simulate the process on a computer, similar as has been explained in connection with the natural twist, and the modification surface that envelopes the flank can be calculated. By evaluating the shape of the intersecting lines between the enveloping surface and the transverse planes I and II, $f_{HaI}$ and $f_{haII}$ and thus the twist of the flank can be obtained.

Figure 4:
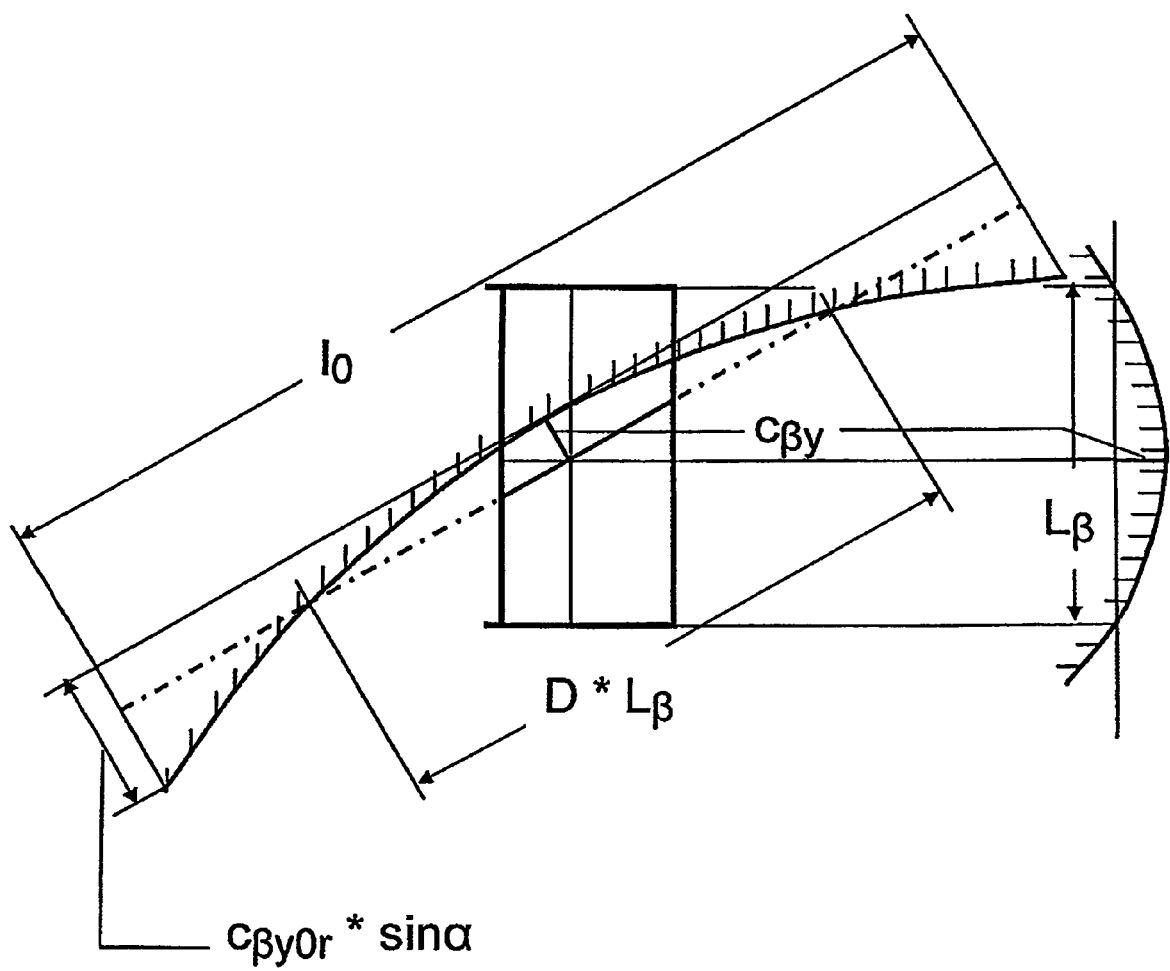
FIG. 4 is a representation of the association of the axes Y and Z and an explanation of the form of the generation contact tracks in the machining of the right flank of a right hand helical gear in the diagonal generating process with hollow-crowned tool as well as explanation of the flank line crowning created in this process.

The twist is preferably determined via the distance of the enveloping surface over the four corner points of the measuring field. To that end, the association of the positions of the tool relative to the Z-position of the respective generation contact track of interest must be available. The diagonal ratio D is useful to make this association. The following applies:

$$D = \Delta y / \Delta z = (y_e - y_a)/(z_e - z_a).$$

where: $\Delta y$ Shift of the tool in the direction of its axis of rotation $\Delta z$ Shift of the tool in the direction of the axis of rotation of the work piece $y_e$ End position of the tool on the Y axis $y_a$ Start position of the tool on the Y axis $z_e$ End position of the tool on the Z axis $z_a$ Start position of the tool on the Z axis If the tool and the work piece are positioned such that the face width of the tooth coincides with the center of the scheduled working area of the worm (FIG. 4) and D is known, there is a clear association of the positions of tool and work piece. Furthermore, if the crowning of the tool is known relative to a path $\Delta y$, the crowning $c_{\beta y}$ created at the work piece can be determined.

The twist resulting from $\Delta y$ can be determined as follows. The distances $f_{10}$, $f_{11}$, $f_{14}$, $f_{15}$ in FIG. 3 are determined as explained for the natural twist. However, contrary to the conditions with the natural twist, the points 8, 9, 12, 13 are not located on the level of the points 10, 11, 14, 15. In the areas of the generation contact tracks between the points 8 and 10, 9 and 11, 12 and 14, 13 and 15, additional height changes are to be determined by the course of the crowning of the tool. The twist $S_{yR}$ of the right flank resulting from the tool geometry in the diagonal process is obtained with the equation:

$$S_{yR} = c_{\beta y} \cdot k_1 + c_{\beta y}/(k_2 * D)$$

The constant K1 is known from the calculation of the natural twist created with the use of a cylindrical tool. The constant $k_2$ is the result of the combination of all constant variables occurring in the calculation explained above. The equation for the calculation of $S_{yR}$ reveals that in the diagonal process, the flank line crowning of the tool generates a flank line crowning $c_{\beta y}$ on the work piece. This creates a twist that can be calculated in the same way as the natural twist that occurs with the use of a cylindrical tool. Furthermore, a portion of the twist that is proportional to $c_{\beta y}/D$ is created. This portion changes its sign if the sign of D is changed.

The explanations above thus lead to the following conclusions. When working with a crowned tool in the diagonal process, the crowning created on the work piece can be calculated as the superimposition of two portions, one of which, $c_{\beta x}$, is generated by changing the center distance during the machining, and the other, $c_{\beta y}$, is generated by using a crowned tool in the diagonal process. The following applies:

$$c_\beta = c_{\beta x} + c_{\beta y}$$

The natural twist created because of the crowning on the work piece, regardless how the crowning was generated, is:

$$S_{nat} = k_1 * c_\beta.$$

In the diagonal process, a crowned tool generates a portion of the natural twist and in addition a portion of the twist which, depending on the selection of the sign of D, increases or decreases the resulting twist. This portion, which is designated as $S_k$ in the following, can be used to "correct" the resulting twist. The following applies:

$$S_k = c_{\beta y}/(k_2 * D)$$

Figure 5:
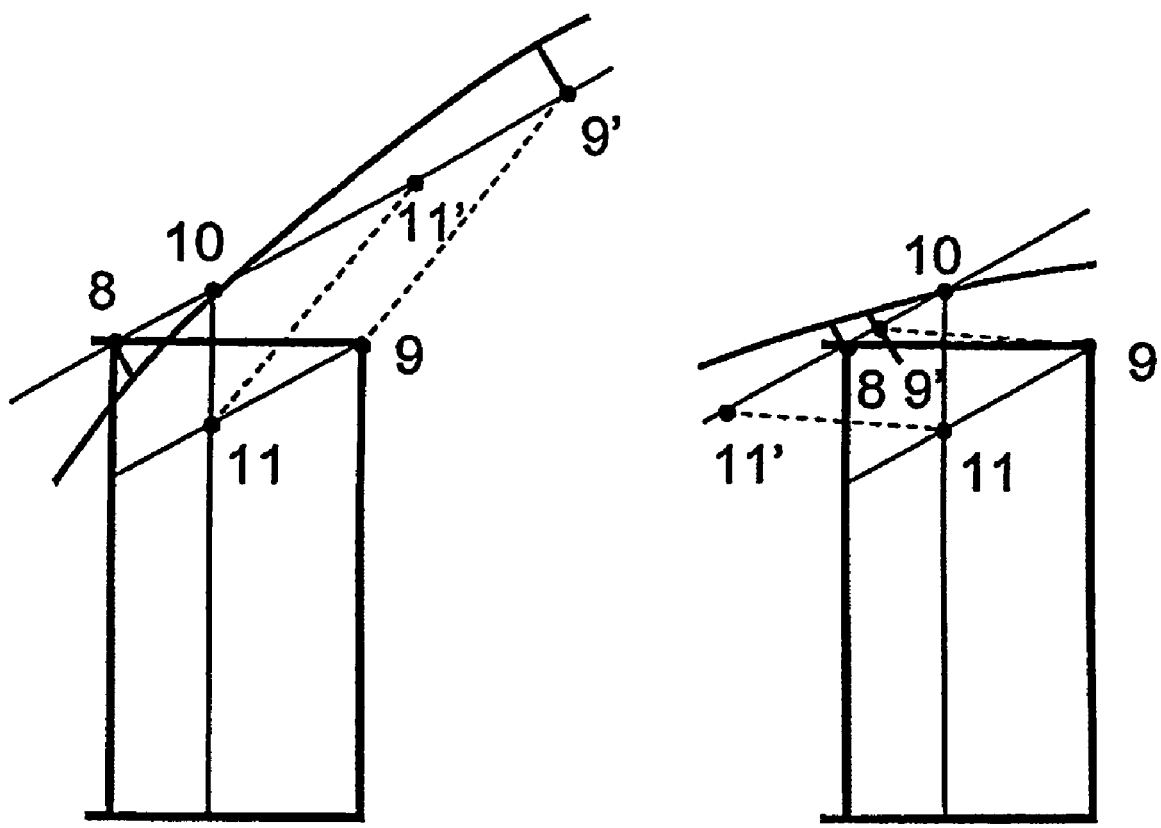
FIG. 5 shows the correlation between the sign of the diagonal ratio and the sign of the portion of the twist through which the twist of the viewed flank is brought to the required value.

FIG. 5 illustrates how the different portions $S_k$ of the twist are created. FIG. 5 shows the measuring field of the right flank of a right hand helical gear for two applications. In the top view, the generation contact tracks are drawn by the corner points 8 and 9 in level 1. Furthermore, a plane is drawn which contains the generation contact track through point 8 and runs perpendicular to the measuring field. This plane is folded into the tangential plane that contains the measuring field. The curved shape of the tool modification is clearly visible. In the left part of the representation, the tool operates near the left end of the worm, and in the right near the right end of the worm. To develop point 9, the respective tool has to slide in the direction of the work piece axis to a smaller Z-position, and additionally in the left part to a greater Y-position and in the right part to a smaller Y-position. This results in D<0 for the diagonal ratio in the left part of the representation and D>0 for the diagonal ratio in the right part of the representation.

Point 9 is developed at the respective position 9' of the tool. A comparison of the modifications at the respective positions 8 and/or 9' of the tool shows: In the left representation, $f_{H\alpha} > 0$ is created in the plane I, and in the right representation $f_{H\alpha} < 0$ is created in the plane I. If the same is applied to level II, it is obvious that the respective $f_{H\alpha}$ values have an opposite sign there.

The effect described here comes about because in the development of the points 8 and/or 9 in the left part of the representation, the point 8 is farther away from the center of the tool than the point 9', and the amount of the tool modification increases as the distance from the center of the tool increases. In the right part of the representation, point 8 is closer to the center of the tool than point 9'.

In connection with the use of an unmodified and/or a crowned tool, it was explained how the respective flank topography created in this manner can be determined. When superimposing the topography determined for both cases, the topography for the standard application case, where the flank line crowning and twist of a work piece is comprised of two respective parts, is obtained. This "resulting" topography can be used to determine the resulting values for flank line crowning and twist.

This method of operation has the disadvantage that the combination of flank line crowning and twist, and thus the desired coordination of the portions of both variables, must be known. Another disadvantage of this method of operation is that only flank line modifications with a behavior that can be described with a quadratic parabola can be covered.

As mentioned above, the twist was stated as measure for the torsion of a flank and calculated as the difference of the profile slope deviations in the planes I and II. This determination is generally applicable when the change of the profile slope deviations occurs between the planes I and II in proportion to the distance from one of these planes. As long as the behavior of the desired flank line modification over the face width can be described with a quadratic parabola, this condition has been met. However, if this condition has not been met, the general term "torsion" of the flanks should be used.

In order to obtain an improved topography for the application cases that vary from the standard scenario, it is proposed to determine a topography that is approximate to the desired flank shape by simulating the production process on a computer. In doing so, the face width is preferably broken down into at least two areas and in each of these areas, the axial distance and diagonal ratio or axial distance and modification of the tool is preferably designed variably during the shifting of the axial carriage. In doing so, the influences of the change of axial distance and diagonal ratio and/or of axial distance and tool modification on the generation contact tracks are determined, superimposed, and iteratively modified so that the desired behavior of the flank lines is created and the torsion is optimally adapted to the specification.

The previous statements relate to right flanks and right hand helical gear wheels. The previous statements on crowning apply to all flanks, i.e. to left flanks and right flanks of left-hand and right-hand helical gears. The natural twist of the right flanks of right-hand helical gears and the left flanks of left-hand helical gears is positive, and that of the remaining flanks is negative. The sign of the diagonal ratio D for the reduction of the amount of natural twist is positive for the right flanks of right-hand helical gears and for the left flanks of left-hand helical gears, and it is negative for the remaining flanks.

A hollow-crowned tool generates a positive crowning on the work piece in the diagonal process. A crowned tool (convex from the outside) generates a hollow-crowned work piece. In that case, a large positive crowning must normally be superimposed on the work piece via a change in the center distance during the machining. The effects explained above can also be obtained with a tool that is convex from the outside. However, unlike with the use of a hollow-crowned tool, the result is a natural twist with the opposite sign. The sign of D also has to be reversed to reduce the amount of a resulting twist relative to the natural twist.

Figure 6:
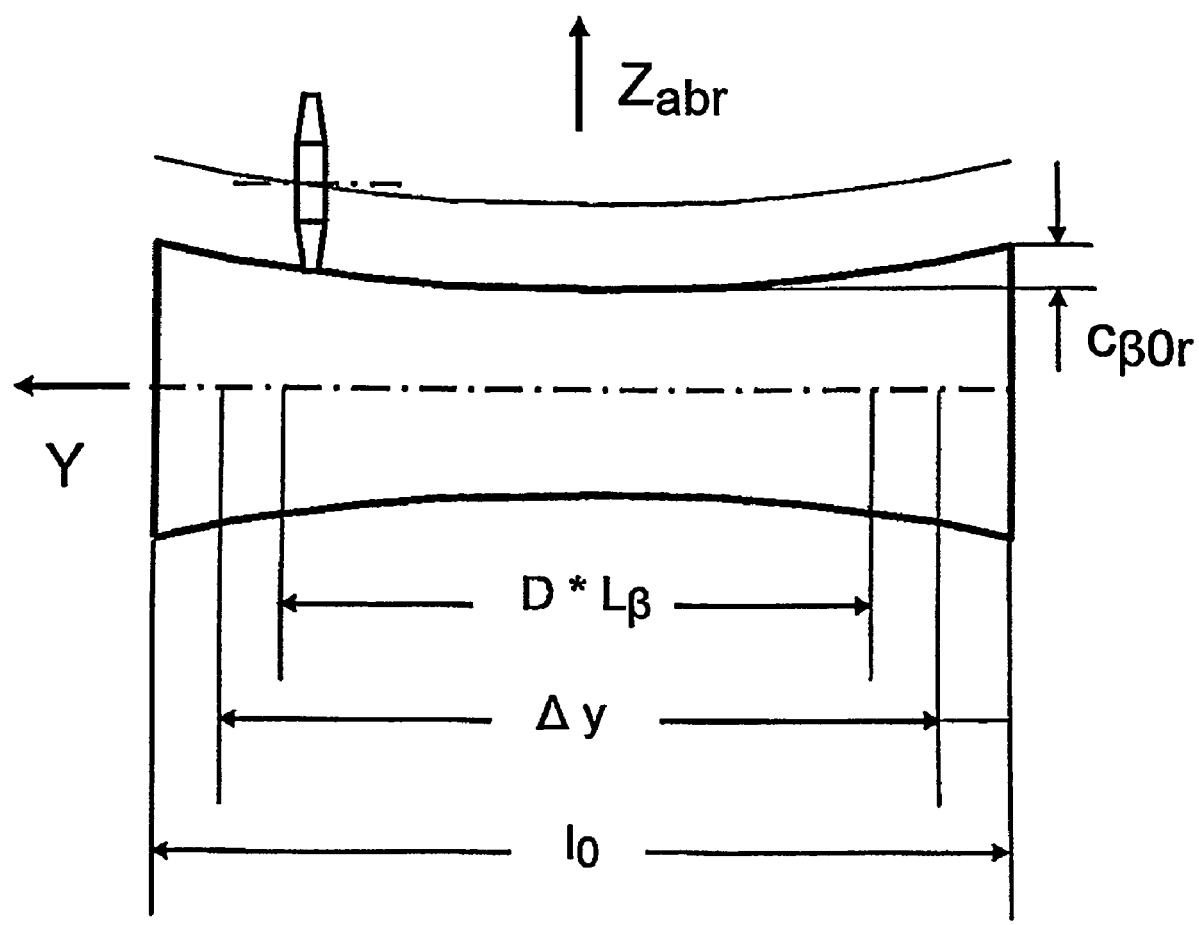
FIG. 6 illustrates a method for generating a crowning or hollow crowning on a volute tool.

One method for generating tool crowning is appropriate for tools that can be trued (FIG. 6). This work is performed with a diamond-coated "double cone disk". The profiling process differs from the profiling of a cylindrical worm only in that the distance between the profiling disk and the worm is changed while the worm is shifted in the direction of its axis. In the center of the worm, a specific axial distance is realized and either increased (negative crowning i.e. hollow crowning of the tool) or decreased (positive crowning) toward the two ends of the worm, corresponding to the square of the distance from the center of the worm. In the transmission of the worm modification, as viewed in the axial section of the tool, it must be noted that the change of the center distance during profiling must be multiplied with $\sin\alpha$ to obtain the crowning on the flanks. The transfer of paths from the tool axis to the work piece axis occurs via the diagonal ratio. The gearing of the tool is not shown in FIG. 6 rather only the course of the modification generated in the profiling of the tool in the axial section is shown in extreme enlargement. The amount of the crowning is $c_{\beta 0r}$.

There are several ways to determine an appropriate coordination between the variables $c_{\beta x}$, $c_{\beta y}$ and D. It is established that the coordination is performed for the right flank of the work piece. To that end, the axial path $\Delta z$ for machining the work piece, including the portion depending on the stock to be removed and a safety amount S, are determined. Furthermore, the path $\Delta y = y_e - y_a$ is determined, by which the tool is to be displaced in the direction of its axis whereas the axial carriage slides $\Delta z = z_e - z_a$. Here, the indices "a" and/or "e" again characterize the start and/or end of a tangential and/or axial carriage stroke. It must be noted that it is not sufficient to profile the tool over the path $\Delta y$. Rather, an additional path that equals the length of the profile development zone $I_{P0}$ plus a safety amount must be profiled. The safety amount allows that the twist to be generated can be adjusted at the work piece to new specifications by changing settings. This is of interest particularly with tools that cannot be trued. It goes without saying that the total required tool length cannot be greater than the useable length.

However, to obtain simple conditions for the production of the tool and/or for the truing, the profiling can extend over the entire length $I_0$ of the tool. In the equations below, $S_{target}$ characterizes the target value of the resulting offset, $c_{\beta 0r}$ the amount of the crowning of the tool in axial section in the case that it is profiled over the length $I_0$ in the method illustrated in FIG. 6. If the target value of the offset is described as $S_{target}$, and if the tool is profiled over the entire length of the worm $I_0$ according to the method introduced in FIG. 6, an amount of crowning of $c_{\beta 0r}$ is required on this length. The following variables must be calculated for the adjustment:

$$D = \Delta y / \Delta z$$

$$S_{nat} = k_1 * c_\beta$$

$$S_k = S_{target} - S_{nat}$$

$$c_{\beta y} = k_2 * D * S_k$$

$$c_{\beta x} = c_\beta - c_{\beta y}$$

$$c_{\beta 0r} = c_{\beta y} / \sin\alpha * (I_0 / (D * I_\beta))^2$$

Finally, the mismatch of the high points of the flank line crowning is removed with known measures, the tool is produced and/or profiled according to the information above, and the machining begins.

While the invention has been described with reference to preferred embodiments it is to be understood that the invention is not limited to the particulars thereof. The present invention is intended to include modifications which would be apparent to those skilled in the art to which the subject matter pertains without eviating from the spirit and scope of the appended claims.

What is claimed is:

1. A method of machining the flanks of a flank line crowned cylindrical gear in a diagonal generating method with a volute tool, said gear having an axis of rotation and said tool having an axis of rotation, said tool being positive or negative crowned in the direction of said axis of rotation, said method comprising:

rotating said tool and said gear about their respective axes;
engaging said tool and said gear;
machining said gear by moving said tool diagonally relative to said gear according to a predetermined diagonal ratio and changing a center distance between tool and work piece during said machining to produce tooth flank surfaces on said gear, said tooth flank surfaces having a predetermined amount of crowning and flank twist;
wherein said predetermined flank twist is composed of a first amount being a natural flank twist resulting from the predetermined flank line crowning of said gear, and a second amount being a flank twist created during machining according to said diagonal ratio, said first amount and said second amount being superimposed to provide said predetermined flank twist; and wherein said predetermined amount of crowning is composed of a first amount resulting from machining with the positive or negative crowned tool according to said diagonal ratio, and a second amount resulting from said changing a center distance between tool and work piece during said machining, said first amount and said second amount being superimposed to provide said predetermined crowning.

2. The method of claim 1 wherein a different gear having a different crowning and/or flank twist is machined with said tool by adjusting said diagonal ratio and said center distance during said machining.

3. Method in accordance with claim 1 characterized in that the tool crowning over the length of the tool can be described with a quadratic parabola.

4. The method of claim 1 wherein said machining comprises single-flank machining and wherein said changing a center distance between tool and work piece is replaced by one of (a) an additional amount of workpiece rotation or (b) a combination of changing a center distance between tool and work piece and an additional amount of workpiece rotation.

5. Method in accordance with claim 4 characterized in that in the case of single-flank machining, the crowning of the tool, the diagonal ratio, and the change of the center distance and/or the change of the additional work piece rotation can be executed so that different values are created for flank line crowning and/or twist on both work piece flanks.

* * * * *